3,085,936
GASTRO-ENTERITIS-DIARRHEAL SYNDROME TREATMENT
Jose Manuel Caldas, East Orange, and Giles St. Clair, Montclair, N.J., assignors to S. B. Penick & Company, New York, N.Y., a corporation of Delaware
No Drawing. Filed Jan. 12, 1962, Ser. No. 166,470
5 Claims. (Cl. 167—53)

This invention relates to therapeutic compositions and treatments. More specifically it relates to compositions and treatments containing an antibiotic for the treatment of scours, the non-specific gastro-enteritis-diarrheal syndrome, in young mammals.

Diarrhea is the most common pathology encountered in young animals during the first days of life. Infection is the major cause of this diarrhea of the newborn, although nutritional deficiencies and dietetic errors may be predisposing factors.

Scouring is encountered in calves, pigs, lambs and foals among domestic animals and appears to have an epizootic counterpart in the stress-promoted chronic respiratory disease (CRD) in young chicks. High mortality rates are usually encountered.

In addition, the gastroenteritis-diarrheal syndrome of the more mature animals, while not often pursuing a fatal course can be economically disastrous in large scale animal husbandry. The gross symptoms are debilitating to the animals, lead to poor overall feed-utilization, and may downgrade the edible meats from the animals exhibiting the syndrome.

The present invention is based on the administration of therapeutic doses of a carboxylic acid ion exchange resin-adsorbate of neomycin to animals exhibiting the syndrome. Such administration, after a few doses, results in excellent control of the condition and rapid recovery. In addition this invention is based on the unexpected finding that the treated animals rapidly recover a normal electrolyte balance. The electrolyte imbalance is the cause of the marked depression often ending in death of the affected young animals. Treatments with neomycin salts or with the ion exchange resins alone do not halt the diarrhea and concomitantly correct the electrolyte imbalance but treatments according to the methods of this invention do achieve such concomitant relief.

The invention sought to be patented resides in the concept of a method of controlling the infections causing the gastroenteritis syndrome and mitigating the electrolyte imbalance caused by the diarrheal aspects of this syndrome and includes the administration of compositions containing the carboxylic acid ion exchange resin complexes with neomycin and the compositions themselves in dosage form.

Ion exchange resins are polymers of crosslinked organic rings having external chemical groupings which participate in the exchange process. In the cationic ion exchange resins the external chemical groupings attached to the rings are of an acidic nature. The most generally useful of such acid groupings are the sulfonic [eX.SO$_3$H] and carboxylic [eX.COOH] where the [eX] is the crosslinked polymeric ring-aggregate of the resin. The resins are classed generally as of the sulfonic or carboxylic types. The component of the resin available for exchange is the ionizable hydrogen of the sulfonic or carboxylic groups.

The carboxylic resins, such as described in U.S. Patent 2,579,974, because they represent the charge of a weak acid, have a preferential affinity for hydrogen ions which latter displace less active cations from the resins. These resins are highly insoluble and stable, although they swell in water and particularly in aqueous alkaline solutions. Such resins are marketed commercially by the Rohm & Haas Company under the tradenames Amberlite IRC-50 and IRC-XE-64.

The hydrogen of the carboxylic group is displaced from the resin in alkaline solutions. In solutions of 5% NaOH or KOH all the ionizable hydrogen ions are displaced by the alkali metal ions. When the resins are in this condition, it has been found that they have an affinity for weakly-basic ionizable substances. In this condition, it has been found that basic antibiotics and similar complex molecules can be almost quantatively separated from fermentation media or other solutions. At present, commercial isolation and purification of certain antibiotics, amino acids, toxins, and enzymes are achieved by this mechanism. Buffered solutions containing these materials are contacted with the resins in the alkali phase i.e., where the carboxyl hydrogen group is displayed by alkali ions. The complex bases then displace the alkali ions from the resins, usually displacing from 25 to 80 percent of the alkali ions, depending on the many factors including the atomic weight, ion size, valence, nature of the solvent, concentrations of competing ions, time of contact and degree of permeability of the resin.

The antibiotic, neomycin, is isolated and purified by adsorption on cationic ion exchange resins. U.S. Patent 2,539,022 to Van Dolah et al. describes such a process and U.S. Patents 2,837,417 and 2,960,437 describe specific purification procedures involving separating neomycin from accompanying salts and contaminants prior to elution of the base and preparation of neomycin salts. U.S. Patent 3,000,792 similarly describes a procedure for the preparation and isolation of neomycin in the presence of the resins and elution of neomycin therefrom. In general, the processes describe fermentation with neomycin-producing organisms and adsorption of the neomycin upon the resins.

After adsorption, which term shall be used for the physico-chemical complexing with ion exchange resins, the neomycin is displaced from the resin either by small quantities of acid or alkali. The antibiotic base is then further purified by the use of special solvents and/or crystallization of the salts.

Neomycin, in base or salt form, has been used for intestinal sterilization prior to intestinal surgery and has no been used in diarrheal conditions in humans in combination with kaolin and bentonite. Neomycin alone has shown some ability to control the diarrhea of scours and similar gastrointestinal conditions in veterinary medicine but its use has been in the form of salts or the base in which forms it is quite expensive.

The use of neomycin, while it has controlled the dirrheal condition, does not affect the other aspects of the scours syndrome such as the electrolyte imbalance. Often as much as a week will pass before the animal will resume its normal feeding and weight-gain pattern. Such a time-lag during the formative periods in the young animal is reflected in the final weight of the animal and the general conformation and meat quality.

The cationic resins have been used in human therapy for reducing sodium intake in patients restricted to the low sodium diets prescribed for hypertensive conditions. In such cases the resins are administered in the hydrogen or alkaline-earth metal phase and are eliminated in the feces in the sodium phase. Carboxylic resins have also been administered to experimental animals to demonstrate adsorption of toxins of bacterial and viral origin. Anionic resins at one time were prescribed in combination with sulfa-drugs in human diarrheal conditions but the combination appears to have been superseded by other forms of medication not containing resins.

We have found that the gastrointestinal-diarrheal syndrome associated with scours and similar debilitating conditions can be relieved by the administration of the ion exchange adsorbate of neomycin. Such resin-adsorbates, in addition to being highly effective, are also low in cost and easy to administer.

The active material of this invention is formed by the base-exchange reaction between a neomycin solution and a carboxlic acid resin. The neomycin solution can be obtained from solutions of salts or the base of neomycin or as a result of the growth of a neomycin-producing strain of *Streptomyces fradiae* in an aqueous nutrient medium. As described in the Waksman Neomycin patent U.S. 2,789,620, the inoculation medium is permitted to ferment until a maximum production of neomycin is obtained. The fermented beer is then cleared of solids, mycelia, insoluble salts, etc. and the clarified beer is neutralized and treated with the carboxylic acid type resin in the alkali phase. The resin is converted to the alkali phase by treatment with either potash or caustic soda. The beer is kept in contact with the resin for periods sufficient to permit substantially complete adsorption of the neomycin activity unto the resin. The resin is then washed, dried and milled. This product is the active therapeutic agent of this invention.

The adsorption preferably is carried out on the clarified beer i.e. one from which the mycelia and insoluble salts resulting from the growth of the streptomyces organism have been removed, but the adsorption can also be carried out on the unclarified beer. In such cases the mycelia can be subsequently removed or the product can be directly dried with the mycelia acting as a nutritive diluent.

The neomycin can also be adsorbed from solutions of the neomycin salts such as the sulfate or hydrochloride or from solvent solutions of neomycin base itself.

The neomycin adsorbate of this invention is apparently nontoxic in either heroic doses or in extended feeding. Attempts to determine a toxic oral dose in mice proved impossible since at a dose of one thousand milligrams per kilogram the material was tolerated by the test animals without ill effect. Higher dosages were beyond the oral capacity of the animals.

Long-term feeding of the material was carried out with pigs and dogs. The long-term feeding of the pigs lasted for forty-nine days. The pigs showed normal growth and feed conversion patterns as compared to controls that did not get the therapeutic supplement. Had there been any toxicity it would have been reflected in these growth and feed conversion values.

The chronic toxicity was also tested in dogs by adding the therapeutic agent to the food ration for twenty days. No change in blood chemistry was noted in the animal and no gross lesions were seen on autopsy.

The therapeutic aspects of the invention will be set forth in the examples below for the various species.

EXAMPLE 1

*Calves.*—Twelve calves suffering from scours were treated on eight different farms. The animals ranged in age from one week to four months. The carboxylic resin adsorbate of neomycin was administered in a dose of approximately 500 milligrams per month of age. When necessary the dose was repeated in twelve hours. Eight animals recovered after the first dose and the rest after the second dose. The recovery was reported as rapid and uneventful and the animals had not relapsed during a followup after three months.

EXAMPLE 2

*Pigs.*—Fifty-four piglets (eight weeks old) were scouring moderately to severely despite the presence of tetracycline antibiotics in their commercial feed. The resin adsorbate of neomycin was added to their 24-hour feed ration at a rate of approximately 3.75 grams per cwt. of feed consumed. The scouring ceased and within twenty-four hours normal stools were resumed. The piglets weighed approximately 60 pounds each.

EXAMPLE 3

*Pigs.*—Twenty piglets ten days old, suffering from oxytetracyline-resistant scours were dosed with the neomycin resin-adsorbate of this invention. Approximately 0.5 gram in water suspension was administered to each animal. Only the single dose was required and the stools returned to normal within 24 hours. Examination by a veterinarian six days after initiation of therapy showed that all were in excellent condition. No relapses had been reported in 60 days after completion of therapy.

EXAMPLE 4

*Pigs.*—Forty piglets, five to fourteen days old and weighing on the average of two to eight pounds, were diagnosed as suffering from severe enteritis associated with the "swollen navel syndrom" (Dr. H. Helms; Report to AVMA 1960 Convention) with mild to severe diarrhea, weakness and dehydration. Each of the pigs was dosed with 450 to 500 milligrams of the neomycin carboxylic resin-adsorbate suspended in sorbitol. Each of the 40 pigs recovered (as reported by the veterinarian) within 12 to 24 hours. He reported that the preparation was not only efficacious in clinically controlling the diarrhea problem but also the pigs rapidly overcame their dehydrated condition.

Further experience with this sorbitol suspension in 300 treatments has shown that this "piglet enteritis syndrome associated with swollen navels" and usually having a farm mortality of 59%–80% when untreated and which was reducible to 30%–50% when treated with a combination of erysipelas serum, parenteral sulfonamides, B complex, saline and iron injections, can be controlled with the neomycin resin-adsorbate according to this invention, the mortality being less than 10%.

EXAMPLE 5

*Pigs.*—Two groups of hogs, one averaging 100 pounds in weight and consisting of 29 hogs and the other averaging 80 pounds weight and consisting of seventeen hogs were suffering infectious swine enteritis. They had been receiving a high-protein commercial feed with a high level of antibiotic supplements. This treatment, however, had no effect on the course of the disease. The animals had severe bloody and mucoid diarrhea with dehydration. The resin-adsorbate of neomycin was added to their normal feed at a rate of fifteen grams per cwt. of consumed feed. The enteritis was controlled within 36 hours and the therapy was discontinued in 48 hours. No relapses were reported during the 30 days post-treatment.

EXAMPLE 6

*Chickens.*—Two flocks of approximately 6,000 chickens each, at four and a half weeks of age were vaccinated for Newcastle disease and laryngotracheitis. This necessitated penning and catching the birds, putting the entire flock under a severe stress. Reaction to vaccination, together with this stress of catching, generally results in a respiratory condition which leads to chronic respiratory disease. Each group was put on a booster feed for three days. The first group was fed a chlortetracycline feed and the second group was given the same containing 100 grams of the neomycin adsorbate per ton of feed. The final weights, food conversions, and total mortality for the two flocks are shown in Table 1.

*Table 1*

CHICKENS

| | Control | Treated |
|---|---|---|
| Number of birds | 6,300 | 5,700 |
| Final weight (pounds) | 3.78 | 3.74 |
| Feed Conversion efficiency (Pounds feed consumed/Pounds weight gained) | 2.43 | 2.31 |
| Mortality (number) | 36 | 18 |

These test results indicate that the chickens fed the neomycin carboxylic acid resin-adsorbate of this invention showed a better reaction to stress and a lower incidence of CRD mortality. The ratio of feed conversion is an indication of this stress reaction and the lower condemnation is an indication of the significantly greater protection afforded by this antibiotic treatment.

The resin adsorbate of neomycin that constitutes the compositional aspects of this invention was also administered experimentally to other domestic animals including dogs and cats. It was administered to dogs for nonspecific enteritis and gastritis and also in cases of severe parasitism such as hookworm infestation and canine coccidiosis caused by *I. felis* and *I. bigemina*. In all cases the gastritis and enteritis disappeared after administration of 0.75 gram of the resin-adsorbate of neomycin. In the cases of concurrent canine coccidiosis in two animals, a course of 0.75 gram of the resin-adsorbate daily for one week resulted in almost complete recovery as indicated by the clearing of parasites from the stool and the reversal of the dehydration and depraved appetites caused by the parasites.

The preferred manner of supplying the therapeutic agents of this invention for admininstration is as a liquid suspension since the animals are at the suckling stage. The resin-adsorbate of neomycin, in finely powdered form is easily suspended in syrups, viscous emulsions or semisolid "sucks." The syrup or emulsions can be administered via bottles or drenches, and the "sucks" on the usual "sugar-teat" mounting. The sucks can be made by mixing the resin with hot concentrated gelatin solutions and then molding the mixture to "teat" form. The resin adsorbate of neomycin can also be administered in solid form. The material can either be mixed into feed as a powder, scattered through the feed ration in pellet form or administered as a bolus. The pellets can consist of the resin as scooped from the ion exchange columns, or larger pellets can be formed by compression or agglomeration of the resin particles. A bolus can be made of the resin directly by compression, or with the use of granulation promotors as is common in tablet making. Single doses can also consist of gelatin capsules, dry-filled with the therapeutic agents. The single resin pellets with neomycin adsorbed mix readily with the chicken feed.

Under most circumstances, the neomycin-resin adsorbate directly from the column in solid, pellet or liquid-suspended state is readily accepted by the animals. The flavors from the fermentation beers acts as attractants. In those species where such flavors are not attractive, various attractants, including brood-milk will stimulate acceptance of the therapeutic agent.

We claim:

1. The method of treating the gastrointestinal-diarrheal syndrome which comprises the oral administration of dosage units of the carboxylic acid resin-adsorbate of neomycin to animals exhibiting the syndrome.

2. The method of treatment according to claim 1 wherein the dosage units of the neomycin adsorbate on carboxylic acid resin are administered in compressed bolus form in individual dosage units.

3. The method of treating scouring according to claim 1 wherein the carboxylic cation exchange resin adsorbate of neomycin also contains adsorbed sodium ions.

4. The method of treating scouring in young animals according to claim 3 wherein the dosage units of the neomycin-adsorbate on carboxylic cation exchange resins contain at least 0.005 gram of the resin-adsorbate per kilogram of body weight of the animal.

5. The method of treating the gastroenteritis-diarrheal syndrome in animals which comprises the oral administration to animals of the carboxylic acid resin-adsorbate of neomycin admixed into the animal's feed ration.

References Cited in the file of this patent

UNITED STATES PATENTS 2,960,437    Friedman _____ Nov. 15, 1960

OTHER REFERENCES

Anns. Int. Med., vol. 34, No. 4, April 1951, pages 1066 to 1073.

U.S. Dispensatory, 25th edition, 1955, Lippincott Co., page 1995 and page 1966.